(12) United States Patent
Nakao et al.

(10) Patent No.: US 11,781,008 B2
(45) Date of Patent: Oct. 10, 2023

(54) THERMOPLASTIC POLYESTER ELASTOMER RESIN COMPOSITION FOR RESIN BELT MATERIALS, AND MOLDED RESIN BELT

(71) Applicant: Du Pont-Toray Co., Ltd., Tokyo (JP)

(72) Inventors: Yuichi Nakao, Nagoya (JP); Yuji Uemura, Nagoya (JP)

(73) Assignee: Toray Celanese Co., Ltd., Tokyo (JP)

( * ) Notice: Subject to any disclaimer, the term of this patent is extended or adjusted under 35 U.S.C. 154(b) by 547 days.

(21) Appl. No.: 16/982,083

(22) PCT Filed: Mar. 13, 2019

(86) PCT No.: PCT/JP2019/010258
§ 371 (c)(1),
(2) Date: Sep. 18, 2020

(87) PCT Pub. No.: WO2019/188285
PCT Pub. Date: Oct. 3, 2019

(65) Prior Publication Data
US 2021/0115247 A1    Apr. 22, 2021

(30) Foreign Application Priority Data
Mar. 30, 2018 (JP) ................... 2018-067008

(51) Int. Cl.
| | | |
|---|---|---|
| *C08L 67/02* | (2006.01) | |
| *C08G 63/183* | (2006.01) | |
| *C08G 63/676* | (2006.01) | |
| *C08K 3/34* | (2006.01) | |
| *C08K 7/14* | (2006.01) | |
| *F16G 1/16* | (2006.01) | |

(52) U.S. Cl.
CPC ............ *C08L 67/02* (2013.01); *C08G 63/183* (2013.01); *C08G 63/676* (2013.01); *C08K 3/34* (2013.01); *C08K 7/14* (2013.01); *F16G 1/16* (2013.01); *C08L 2203/30* (2013.01); *C08L 2205/02* (2013.01); *C08L 2205/24* (2013.01)

(58) Field of Classification Search
None
See application file for complete search history.

(56) References Cited

U.S. PATENT DOCUMENTS

2015/0376373 A1* 12/2015 Shoji ................... C08K 5/29
525/450

FOREIGN PATENT DOCUMENTS

| JP | 4200396 | * 12/2008 |
|---|---|---|
| JP | 2011-006519 A | 1/2011 |
| JP | 2011/207926 | * 10/2011 |
| JP | 2017-172794 A | 9/2017 |

OTHER PUBLICATIONS

Machine translation of JP 2011/207926 (Year: 2011).*
Machine translation of JP 4200396 (Year: 2008).*

* cited by examiner

*Primary Examiner* — Robert T Butcher
(74) *Attorney, Agent, or Firm* — DLA Piper LLP (US)

(57) ABSTRACT

A polyester elastomer resin composition for resin belt materials contains 80-92.99% by weight of a thermoplastic polyester elastomer (A), 7-19.99% by weight of glass fibers (B) and 0.01-5.0% by weight of a crystal nucleator (C), and which is also characterized in that: the thermoplastic polyester elastomer (A) is a polyester block copolymer which contains 40-70% by weight of a high melting point crystalline polymer segment (a1) that is composed of a crystalline aromatic polyester unit and 30-60% by weight of a low melting point polymer segment (a2) that is composed of an aliphatic polyether unit; and the melt flow rate as determined in accordance with ASTM D1238 at 230° C. under a load of 2,160 g is 1.0 g/10 min or more but less than 10.0 g/10 min.

12 Claims, No Drawings

THERMOPLASTIC POLYESTER ELASTOMER RESIN COMPOSITION FOR RESIN BELT MATERIALS, AND MOLDED RESIN BELT

TECHNICAL FIELD

This disclosure relates to a thermoplastic polyester elastomer resin composition for resin belt materials that has high resin strength, excellent moldability, and excellent flex fatigue resistance and particularly has good flex fatigue resistance at low temperature, and a molded resin belt.

BACKGROUND

Polyester block copolymers including a crystalline aromatic polyester unit as a hard segment and including an aliphatic polyether unit such as poly(alkylene oxide) glycol and/or an aliphatic polyester unit such as polylactone as a soft segment are excellent in mechanical properties such as strength, impact resistance, an elastic recovery property, and flexibility, a low temperature characteristic, and a high temperature characteristic. In addition, polyester block copolymers are thermoplastic and easy to mold and, therefore, they are widely used in fields such as automobiles, electric/electronic parts, and consumer products.

Polyester block copolymers are excellent in flexibility and flex fatigue resistance among the above-described properties, and are easy to mold. Therefore, they are used as resin belt materials. Examples of the resin belt include a toothed belt having a structure in which teeth are meshed with a gear, and a belt slides as the gear rotates. The sliding operation is repeated during use. Therefore, the belt strength and the flex fatigue resistance are particularly important in that method of use.

There has been a problem that in general, when the resin strength is increased, the flex fatigue resistance is deteriorated, and when the flex resistance is increased, the resin strength is deteriorated. Furthermore, it is necessary to suppress the occurrence of a sink mark in a belt molded product because the belt strength is affected by the dimension of the belt molded product. Therefore, a method is known in which a glass fiber is added to a thermoplastic elastomer to increase the resin strength and the molecular weight, and improve the flex fatigue of the resin. (Japanese Patent Laid-open Publication No. 2017-172794)

Resin belts are widely used in applications such as electrical appliance parts and automobile parts and, in such applications, the operating environment covers a wide temperature range from low temperature (−40° C.) to high temperature (80° C.). Therefore, resin belt materials are also required to have a good property in a wide temperature range. However, in the method described in JP '794, there is a concern that the flexibility and the flex fatigue resistance will be deteriorated particularly at low temperature, and the resin belt will be broken during the use.

It could therefore be helpful to provide a thermoplastic polyester elastomer resin composition for resin belt materials that is good in balance between resin strength and flex fatigue resistance and excellent in impact resistance not only at room temperature but also at low temperature, and a molded resin belt including the thermoplastic polyester elastomer resin composition.

SUMMARY

We thus provide:

A thermoplastic polyester elastomer resin composition for resin belt materials includes 80 to 92.99% by weight of a thermoplastic polyester elastomer (A), 7 to 19.99% by weight of a glass fiber (B), and 0.01 to 5.0% by weight of a crystal nucleator (C), and in the thermoplastic polyester elastomer resin composition, the thermoplastic polyester elastomer (A) is a polyester block copolymer including 40 to 70% by weight of a high melting point crystalline polymer segment (a1) including a crystalline aromatic polyester unit, and 30 to 60% by weight of a low melting point polymer segment (a2) including an aliphatic polyether unit, and a melt flow rate measured in accordance with ASTM D1238 at 230° C. under a load of 2,160 g is 1.0 g/10 min or more and less than 10.0 g/10 min.

Furthermore, the molded resin belt includes the thermoplastic polyester elastomer resin composition for resin belt materials.

As will be described below, it is thus possible to obtain the thermoplastic polyester elastomer resin composition for resin belt materials that is good in balance between the resin strength and the flex fatigue resistance and excellent in impact resistance not only at room temperature but also at low temperature.

DETAILED DESCRIPTION

Our compositions and molded resin belts will be described below.

The thermoplastic polyester elastomer (A) is a polyester block copolymer including, as constituent components, a high melting point crystalline polymer segment (a1) mainly including a crystalline aromatic polyester unit, and a low melting point polymer segment (a2) mainly including an aliphatic polyether unit, and the high melting point crystalline polymer segment mainly includes a crystalline aromatic polyester unit, that is, the high melting point crystalline polymer segment is a polyester mainly including an aromatic dicarboxylic acid or an ester-forming derivative of an aromatic dicarboxylic acid and a diol or an ester-forming derivative of a diol.

Examples of the aromatic dicarboxylic acid or its ester-forming derivative include terephthalic acid, isophthalic acid, phthalic acid, naphthalene-2,6-dicarboxylic acid, naphthalene-2,7-dicarboxylic acid, anthracene dicarboxylic acid, diphenyl-4,4'-dicarboxylic acid, diphenoxyethanedicarboxylic acid, 4,4'-diphenyletherdicarboxylic acid, 5-sulfoisophthalic acid, and sodium 3-sulfoisophthalate. Although the aromatic dicarboxylic acid is mainly used, a part of the aromatic dicarboxylic acid may be substituted with an alicyclic dicarboxylic acid such as 1,4-cyclohexanedicarboxylic acid, cyclopentanedicarboxylic acid, or 4,4'-dicyclohexyldicarboxylic acid, or an aliphatic dicarboxylic acid such as adipic acid, succinic acid, oxalic acid, sebacic acid, dodecanedioic acid, or a dimer acid. Furthermore, an ester-forming derivative of a dicarboxylic acid such as a lower alkyl ester, an aryl ester, a carbonic acid ester, or an acid halide can of course be used equivalently.

The aromatic dicarboxylic acid or its ester-forming derivative as the dicarboxylic acid component is preferably terephthalic acid or dimethyl terephthalate, and is more preferably terephthalic acid.

The diol or its ester-forming derivative is preferably a diol having a molecular weight of 400 or less, and examples of the diol include aliphatic diols such as 1,4-butanediol, ethylene glycol, trimethylene glycol, pentamethylene glycol, hexamethylene glycol, neopentyl glycol, and decamethylene glycol, alicyclic diols such as 1,1-cyclohexanedimethanol, 1,4-dicyclohexanedimethanol, and tricyclodecanedimethanol, and aromatic diols such as xylylene glycol, bis(p-hydroxy)diphenyl, bis(p-hydroxy)diphenylpropane, 2,2'-bis[4-(2-hydroxyethoxy)phenyl]propane, bis[4-(2-hydroxyethoxy)phenyl]sulfone, 1,1-bis[4-(2-hydroxyethoxy)phenyl]cyclohexane, 4,4'-dihydroxy-p-terphenyl, and 4,4'-dihydroxy-p-quarterphenyl. Such a diol can be used in the form of an ester-forming derivative such as an acetyl compound or an alkali metal salt.

These dicarboxylic acids, the derivatives of the dicarboxylic acids, the diol components, and the derivatives of the diol components may be used in combination of two or more kinds thereof.

Preferable examples of the high melting point crystalline polymer segment (a1) preferably used include a segment including a polybutylene terephthalate unit derived from terephthalic acid or dimethyl terephthalate and from 1,4-butanediol, and a segment including a polybutylene isophthalate unit derived from isophthalic acid or dimethyl isophthalate and from 1,4-butanediol. The high melting point crystalline polymer segment (a1) usually has a copolymerization amount of 40 to 70% by weight, and preferably 50 to 70% by weight.

The copolymerization amount of the high melting point crystalline polymer segment (a1) is, for example, the total of the percentages by mass of terephthalic acid and 1,4-butanediol in that the high melting point crystalline polymer segment (a1) includes a polybutylene terephthalate unit as a constituent component.

The low melting point polymer segment (a2) used in the thermoplastic polyester elastomer (A) mainly includes an aliphatic polyether.

Specific examples of the aliphatic polyether include poly(ethylene oxide) glycol, poly(propylene oxide) glycol, poly(trimethylene oxide) glycol, poly(tetramethylene oxide) glycol, poly(hexamethylene oxide) glycol, a copolymer of ethylene oxide and propylene oxide, an ethylene oxide adduct of poly(propylene oxide) glycol, and a copolymer of ethylene oxide and tetrahydrofuran. Among the aliphatic polyethers, an ethylene oxide adduct of poly(tetramethylene oxide) glycol and/or poly(propylene oxide) glycol, and/or a copolymer of ethylene oxide and tetrahydrofuran is preferably used.

The low melting point polymer segment (a2) of the thermoplastic polyester elastomer (A) usually has a copolymerization amount of 30 to 60% by weight, and preferably 30 to 50% by weight.

The copolymerization amount of the low melting point crystalline polymer segment (a2) is, for example, the percentage by mass of poly(tetramethylene oxide) glycol in that the low melting point crystalline polymer segment (a2) includes a poly(tetramethylene oxide) glycol unit as a constituent component.

The thermoplastic polyester elastomer (A) can be produced by a known method. As a specific example of the known method, any method may be used of, for example, a method in which a lower alcohol diester of a dicarboxylic acid, an excess amount of a low molecular weight glycol, and a low melting point polymer segment component are subjected to a transesterification reaction in the presence of a catalyst, and the resulting reaction product is melt-polycondensed, or a method in which a dicarboxylic acid, an excess amount of glycol, and a low melting point polymer segment component are subjected to an esterification reaction in the presence of a catalyst, and the resulting reaction product is melt-polycondensed.

The thermoplastic polyester elastomer (A) prepared by the polycondensation is then subjected to solid phase polycondensation. The solid phase polycondensation is performed at a temperature at which the thermoplastic polyester elastomer (A) pelletized after the melt polycondensation is not fused, and is usually performed in the temperature range of 140° C. to 220° C. Prior to the solid phase polycondensation, a step of precrystallization and drying is preferably performed. The solid phase polycondensation is performed under high vacuum or under an inert gas stream. When performed under high vacuum, the solid phase polycondensation is preferably performed under a reduced pressure of 665 Pa or less, and more preferably 133 Pa or less. When performed under an inert gas stream, the solid phase polycondensation is preferably performed typically under a nitrogen gas stream. The pressure is not particularly limited, and atmospheric pressure is preferable. As the reaction vessel, it is preferable to use a rotatable vacuum dryer, a tower dryer capable of flowing an inert gas, or the like.

The blending amount of the thermoplastic polyester elastomer (A) is 80 to 92.99% by weight based on the total amount of the thermoplastic polyester elastomer (A), the glass fiber (B), and the crystal nucleator (C) included in the thermoplastic polyester elastomer resin composition for resin belt materials.

The glass fiber (B) is a chopped strand glass fiber or a roving glass fiber, and a glass fiber is preferably used that is treated with a sizing agent containing, for example, a silane coupling agent such as an aminosilane compound or an epoxysilane compound and/or at least one epoxy compound such as bisphenol A diglycidyl ether or a novolac-based epoxy compound.

The glass fiber (B) preferably has an average fiber diameter of 5 to 20 μm. The average fiber length of the glass fiber (B) is not particularly limited, and is preferably 0.1 to 20 mm, and more preferably 0.1 to 5 mm.

The blending amount of the glass fiber (B) is 7 to 19.99% by weight based on the total amount of the thermoplastic polyester elastomer (A), the glass fiber (B), and the crystal nucleator (C) included in the thermoplastic polyester elastomer composition for resin belt materials.

The crystal nucleator (C) is not particularly limited as long as it is unmelted at the time of melt-processing and can be a nucleus of a crystal in the cooling process. The crystal nucleator (C) is preferably an inorganic substance, and among inorganic substances, plate-shaped fillers and granular fillers are preferably used. Specific examples of the plate-shaped filler include talc, mica, and glass flakes, and specific examples of the granular filler include calcium carbonate, clay, barium sulfate, and glass beads.

The blending amount of the crystal nucleator (C) is 0.01 to 5% by weight based on the total amount of the thermoplastic polyester elastomer (A), the glass fiber (B), and the crystal nucleator (C) included in the thermoplastic polyester elastomer composition for resin belt materials.

Furthermore, a polyester resin (D) is further added to the thermoplastic polyester elastomer resin composition for resin belt materials to improve the belt strength.

The polyester resin (D) is prepared by polycondensation of at least one acid component selected from terephthalic acid, 2,6-naphthalenedicarboxylic acid, isophthalic acid or the like and at least one diol component selected from ethylene glycol, propylene glycol, butylene glycol, hexylene glycol or the like, and specific examples of the polyester resin (D) include polybutylene terephthalate (PBT), polypropylene terephthalate (PPT), polyethylene terephthalate (PET), polyhexylene terephthalate (PHT), polyethylene naphthalate, polybutylene naphthalate (PBN), polycyclohexane-1,4-dimethylol terephthalate, and copolyesters such as polyethylene isophthalate/terephthalate (PET/I) and polybutylene (terephthalate/isophthalate) (PET/I).

Among the polyester resins, polyethylene terephthalate, polybutylene terephthalate, polybutylene naphthalate, and polybutylene (terephthalate/isophthalate) are preferable, and polybutylene terephthalate is more preferable.

The blending amount of the polyester resin (D) is preferably 5 to 30% by weight based on the amount of the thermoplastic polyester elastomer resin composition for resin belt materials, that is, based on the total amount of the thermoplastic polyester elastomer (A), the glass fiber (B), the crystal nucleator (C), and the polyester resin (D).

To the thermoplastic polyester elastomer resin composition for resin belt materials, if necessary, an additive such as an antioxidant, an ultraviolet absorber, a light stabilizer, an antistatic agent, a lubricant, a dye, a pigment, a plasticizer, a flame retardant, a release agent, or a silicone oil can be added as long as the desired effect is not impaired.

In the thermoplastic polyester elastomer composition for resin belt materials, the melt flow rate measured in accordance with ASTM D1238 at 230° C. under a load of 2,160 g is 1.0 g/10 min or more and less than 10.0 g/10 min. As described above, it is important to use the thermoplastic elastomer (A) produced by the solid phase polycondensation. Because the melt flow rate is 1.0 g/10 min or more and less than 10.0 g/10 min, it is possible to provide a thermoplastic polyester elastomer resin composition for resin belt materials that is excellent in balance between the resin strength and the flex fatigue resistance not only at room temperature but also at low temperature, and a molded resin belt including the thermoplastic polyester elastomer resin composition.

In the thermoplastic polyester elastomer composition for resin belt materials, the flexural modulus measured in accordance with ASTM D790 at 23° C. is preferably 900 MPa or more, and the flexural modulus measured in accordance with ASTM D790 at -30° C. is preferably 2,000 MPa or less.

The molded resin belt includes the thermoplastic polyester elastomer composition for resin belt materials that is molded. In the molded resin belt, the sliding operation is repeated at the time of use. Therefore, the belt strength and the flex fatigue resistance are particularly important, and the thermoplastic polyester elastomer composition for resin belt materials is preferably used.

EXAMPLES

Our compositions and molded resin belts will be described below with reference to Examples. They can be appropriately modified and implemented within the scope of this disclosure. In Examples, the units "%" and "part" are based on weight unless otherwise specified. The physical properties shown in Examples are measured by the following measuring methods.

Melting Point and Crystallization Temperature

Using DSC Q100 manufactured by TA Instruments, heating was performed at a temperature rise rate of 20° C./min from 40° C. to 250° C. in a nitrogen atmosphere, the temperature was hold at 250° C. for 3 minutes, and then cooling was performed at a temperature fall rate of 10° C./min to 40° C. to measure the crystallization temperature.

Furthermore, heating was performed at a temperature rise rate of 10° C./min to 250° C., and the peak temperature at the melting peak was measured during the heating.

Melt Flow Rate

The melt flow rate was measured in accordance with ASTM D1238 at 230° C. under a load of 2,160 g.

Tensile Breaking Strength and Tensile Breaking Elongation

Using an injection molding machine (NEX-1000 manufactured by NISSEI PLASTIC INDUSTRIAL CO., LTD.), a pellet dried with hot air at 90° C. for 3 hours or more was molded into a JIS K7113 No. 2 dumbbell test piece under the molding conditions of a cylinder temperature of 240° C. and a mold temperature of 50° C., and measurement was performed in accordance with JIS K7113 (1995 version).

Flexural Modulus

Using an injection molding machine (NEX-1000 manufactured by NISSEI PLASTIC INDUSTRIAL CO., LTD.), a pellet dried with hot air at 90° C. for 3 hours or more was molded into a test piece under the molding conditions of a cylinder temperature of 240° C. and a mold temperature of 50° C., and the test piece was measured in accordance with ASTM D790 in an atmosphere of 23° C. and in an atmosphere of -30° C.

Flex Fatigue (23° C., -30° C.)

Using an injection molding machine (NEX-1000 manufactured by NISSEI PLASTIC INDUSTRIAL CO., LTD.), a pellet dried with hot air at 90° C. for 3 hours or more was molded into a thick square plate having a length of 120 mm, a width of 75 mm, and a thickness of 2 mm under the molding conditions of a cylinder temperature of 240° C. and a mold temperature of 50° C., a strip having a length of 50 mm, a width of 6 mm, and a thickness of 2 mm was cut out from the thick square plate, and using a de Mattia flex fatigue tester, the number of flexes was measured until the strip was broken with stroke of a distance between chucks from 30 mm to 20 mm in an atmosphere of 23° C. and in an atmosphere of -30° C.

Izod Impact Strength (23° C., -30° C.)

Using an injection molding machine (NEX-1000 manufactured by NISSEI PLASTIC INDUSTRIAL CO., LTD.), a pellet dried with hot air at 90° C. for 3 hours or more was molded into a test piece under the molding conditions of a cylinder temperature of 240° C. and a mold temperature of 50° C., and the test piece was measured in accordance with ASTM D256 in an atmosphere of 23° C. and in an atmosphere of -30° C.

Extrusion Moldability

A pellet dried with hot air at 90° C. for 3 hours or more was molded into a resin belt under the temperature condition of 220 to 250° C. using a single screw extruder. The external dimension of the belt was measured. The extrusion moldability was evaluated in accordance with the criteria, A: the shrinkage of the central portion of the belt is 0.5% or less, and B: the shrinkage of the central portion of the belt is 1% or less.

Preparation of Polyester Elastomer (A-1)

Into a reaction vessel equipped with a helical ribbon stirring blade, 505 parts of terephthalic acid and 251 parts of 1,4-butanediol as the high melting point crystalline polymer segment (a1), 354 parts of poly(tetramethylene oxide) glycol having a number average molecular weight of about 1,400 as the low melting point polymer segment (a2), 0.3 parts of titanium tetrabutoxide, and 0.2 parts of mono-n-butyl-monohydroxytin oxide were put, and the mixture was heated at 190 to 225° C. for 3 hours and subjected to an esterification reaction while the reaction water was distilled out of the system. To the reaction mixture, 2.0 parts of titanium tetrabutoxide was further added, 0.5 parts of "Irganox" 1098 (a hindered phenol-based antioxidant manufactured by Ciba-Geigy) was added, then the temperature was raised to 245° C., then the pressure in the system was reduced for 50 minutes to 0.2 mmHg, and the mixture was subjected to melt polycondensation for 2 hours and 45 minutes under the above-described conditions. The obtained polyester elastomer was discharged in water in the form of a strand and cut into a pellet.

The pellet of the polyester elastomer was put into a rotatable reaction vessel, the pressure in the system was reduced to 27 Pa, and the pellet was heated at 170 to 180° C. for 48 hours while rotated, and subjected to solid phase polycondensation. The melt flow rate of the obtained pellet of the polyester elastomer (A-1) was 2 g/10 minutes as a result of measurement at 230° C. under a load of 2,160 g. The percentage by weight of the high melting point crystalline polymer segment (a1) was 65, and the percentage by weight of the low melting point polymer segment (a2) was 35.

Preparation of Polyester Elastomer (A-2)

Into a reaction vessel equipped with a helical ribbon stirring blade, 420 parts of terephthalic acid and 196 parts of 1,4-butanediol as the high melting point crystalline polymer segment (a1), 480 parts of poly(tetramethylene oxide) glycol having a number average molecular weight of about 1,400 as the low melting point polymer segment (a2), 0.3 parts of titanium tetrabutoxide, and 0.2 parts of mono-n-butyl-monohydroxytin oxide were put, and the mixture was heated at 190 to 225° C. for 3 hours and subjected to an esterification reaction while the reaction water was distilled out of the system. To the reaction mixture, 2.0 parts of titanium tetrabutoxide was further added, 0.5 parts of "Irganox" 1098 (a hindered phenol-based antioxidant manufactured by Ciba-Geigy) was added, then the temperature was raised to 245° C., then the pressure in the system was reduced for 50 minutes to 0.2 mmHg, and the mixture was subjected to melt polycondensation for 2 hours and 45 minutes under the above-described conditions. The obtained polyester elastomer was discharged in water in the form of a strand and cut into a pellet.

The pellet of the polyester elastomer was put into a rotatable reaction vessel, the pressure in the system was reduced to 27 Pa, and the pellet was heated at 170 to 180° C. for 48 hours while rotated, and subjected to solid phase polycondensation. The melt flow rate of the obtained pellet of the polyester elastomer (A-2) was 2 g/10 minutes as a result of measurement at 220° C. under a load of 2,160 g. The percentage by weight of the high melting point crystalline polymer segment (a1) was 52, and the percentage by weight of the low melting point polymer segment (a2) was 48.

Preparation of Polyester Elastomer (A-3)

Into a reaction vessel equipped with a helical ribbon stirring blade, 593 parts of terephthalic acid and 307 parts of 1,4-butanediol as the high melting point crystalline polymer segment (a1), 229 parts of poly(tetramethylene oxide) glycol having a number average molecular weight of about 1,400 as the low melting point polymer segment (a2), 0.3 parts of titanium tetrabutoxide, and 0.2 parts of mono-n-butyl-monohydroxytin oxide were put, and the mixture was heated at 190 to 225° C. for 3 hours and subjected to an esterification reaction while the reaction water was distilled out of the system. To the reaction mixture, 2.0 parts of titanium tetrabutoxide was further added, 0.5 parts of "Irganox" 1098 (a hindered phenol-based antioxidant manufactured by Ciba-Geigy) was added, then the temperature was raised to 245° C., then the pressure in the system was reduced for 50 minutes to 0.2 mmHg, and the mixture was subjected to melt polycondensation for 2 hours and 45 minutes under the above-described conditions. The obtained polyester elastomer (A-3) was discharged in water in the form of a strand and cut into a pellet. The percentage by weight of the high melting point crystalline polymer segment (a1) was 78, and the percentage by weight of the low melting point polymer segment (a2) was 22.

Preparation of Polyester Elastomer (A-4)

The pellet of the polyester elastomer (A-3) was put into a rotatable reaction vessel, the pressure in the system was reduced to 27 Pa, and the pellet was heated at 170 to 180° C. for 48 hours while rotated, and subjected to solid phase polycondensation. The melt flow rate of the obtained pellet of the polyester elastomer (A-4) was 2 g/10 minutes as a result of measurement at 240° C. under a load of 2,160 g.

Preparation of Polyester Elastomer (A-5)

Into a reaction vessel equipped with a helical ribbon stirring blade, 505 parts of terephthalic acid and 251 parts of 1,4-butanediol as the high melting point crystalline polymer segment (a1), 354 parts of poly(tetramethylene oxide) glycol having a number average molecular weight of about 1,400 as the low melting point polymer segment (a2), 0.3 parts of titanium tetrabutoxide, and 0.2 parts of mono-n-butyl-monohydroxytin oxide were put, and the mixture was heated at 190 to 225° C. for 3 hours and subjected to an esterification reaction while the reaction water was distilled out of the system. To the reaction mixture, 2.0 parts of titanium tetrabutoxide was further added, 0.5 parts of "Irganox" 1098 (a hindered phenol-based antioxidant manufactured by Ciba-Geigy) was added, then the temperature was raised to 245° C., then the pressure in the system was reduced for 50 minutes to 0.2 mmHg, and the mixture was subjected to melt polycondensation for 2 hours and 45 minutes under the above-described conditions. The obtained polyester elastomer (A-5) was discharged in water in the form of a strand and cut into a pellet. The percentage by weight of the high melting point crystalline polymer segment (a1) was 65, and the percentage by weight of the low melting point polymer segment (a2) was 35.

Glass Fiber (B)

A chopped strand glass fiber, CS3J948 manufactured by NITTO BOSEKI CO., LTD. was used. The fiber diameter was about 10 μm.

Crystal Nucleator (C)

High toron (hydrous magnesium silicate) manufactured by Takehara Chemical Industrial Co., Ltd. was used. The average particle size was 4 μm.

Polyester Resin (D)

A polybutylene terephthalate (PBT) resin, TORAYCON 11005 (manufactured by Toray Industries, Inc.) was used.

Examples 1 to 4

Using a twin-screw extruder having a screw having a diameter of 45 mm, the polyester elastomer (A-1), (A-2), and if necessary, the crystal nucleator (C), and the polyester resin (D) that are shown in Examples for reference were mixed in the blending composition shown in Table 1 and added from the charging section. A side feeder was installed between the charging section and the vent section, and the glass fiber (B) was added in the addition amount shown in Table 1 as in the above. The mixture was melt-mixed under extrusion conditions of a heating temperature of 250° C. and a screw rotation speed of 150 rpm, discharged in the form of a strand, passed through a cooling bath, and pelletized by a strand cutter to obtain a thermoplastic polyester elastomer resin composition for resin belt materials.

The obtained pellet was dried at 80° C. for 5 hours and then injection-molded under conditions of a cylinder temperature of 230° C. to 250° C. and a mold temperature of 50° C. to obtain test pieces for a tensile breaking strength test, a tensile breaking elongation test, a flexural modulus test, a flex fatigue resistance test, and an Izod impact strength test. Using the obtained test pieces as a molded resin belt sample, various tests were performed. The test results are shown in Table 1.

TABLE 1

| | | (a1) % by weight | (a2) % by weight | Solid phase polycondensation | | Unit | | Example 1 | | Example 2 | | Example 3 | | Example 4 | |
|---|---|---|---|---|---|---|---|---|---|---|---|---|---|---|---|
| Composition | Thermoplastic polyester elastomer | A-1 | 65 | 35 | Performed | Percentage by weight based on composition | Percentage by weight based on total amount of A to C | 85.9 | 85.9 | 64.9 | 86.5 | — | — | — | — |
| | | A-2 | 52 | 48 | Performed | | | — | — | — | — | 79.9 | 79.9 | 60.9 | 81.2 |
| | Glass fiber B | | | | | | | 14 | 14 | 10 | 13.3 | 20 | 20 | 14 | 18.7 |
| | Crystal nucleator C | | | | | | | 0.1 | 0.1 | 0.1 | 0.13 | 0.1 | 0.1 | 0.1 | 0.13 |
| | Polyester Resin D | | | | | Percentage by weight based on composition | | — | | 25 | | — | | 25 | |
| Physical property | Melting point | | | | | °C. | | 210 | | 220 | | 206 | | 221 | |
| | Crystallization temperature | | | | | °C. | | 190 | | 193 | | 188 | | 191 | |
| | Melt flow rate (230° C.) | | | | | g/10 min | | 3 | | 4 | | 3 | | 3 | |
| | Tensile breaking strength | | | | | MPa | | 46 | | 44 | | 45 | | 46 | |
| | Tensile breaking elongation | | | | | % | | 20 | | 19 | | 22 | | 23 | |
| | Flexural modulus (23° C.) | | | | | MPa | | 1,250 | | 1,180 | | 1,200 | | 1,175 | |
| | Flexural modulus (−30° C.) | | | | | MPa | | 1,750 | | 1,780 | | 1,680 | | 1,675 | |
| | Flex fatigue resistance [Number of breaking] (23° C.) | | | | | Times | | 300,000 | | 250,000 | | 300,000 | | 250,000 | |
| | Flex fatigue resistance [Number of breaking] (−30° C.) | | | | | Times | | 11,000 | | 10,000 | | 14,000 | | 16,000 | |
| | Izod impact strength (23° C.) | | | | | J/m | | 40 | | 37 | | 45 | | 42 | |
| | Izod impact strength (−30° C.) | | | | | J/m | | 18 | | 16 | | 20 | | 19 | |
| | Extrusion moldability | | | | | — | | A | | A | | B | | B | |

As is clear from the results in Table 1, the molded resin belts obtained from the thermoplastic polyester elastomer resin compositions for resin belt materials shown in Examples 1 to 4 had high resin strength, excellent flex fatigue resistance, and impact resistance at room temperature. Furthermore, the molded resin belts had flexibility maintained even at −30° C., and were excellent in flex fatigue resistance and impact resistance at −30° C.

Comparative Examples 1 to 5

Using a twin-screw extruder having a screw having a diameter of 45 mm, the polyester elastomer (A-3), (A-4), (A-5), and if necessary, the crystal nucleator (C), and the polyester resin (D) that are shown in Examples for reference were mixed in the blending composition shown in Table 2 and added from the charging section. A side feeder was installed between the charging section and the vent section, and the glass fiber (B) was added in the addition amount shown in Table 2 as in the above. The mixture was melt-mixed under extrusion conditions of a heating temperature of 250° C. and a screw rotation speed of 150 rpm, discharged in the form of a strand, passed through a cooling bath, and pelletized by a strand cutter to obtain a thermoplastic polyester elastomer resin composition.

The obtained pellet was dried at 80° C. for 5 hours and then injection-molded under conditions of a cylinder temperature of 230° C. to 250° C. and a mold temperature of 50° C. to obtain test pieces for a tensile breaking strength test, a tensile breaking elongation test, a flexural modulus test, a flex fatigue resistance test, and an Izod impact strength test. Using the obtained test pieces as a molded resin belt sample, various tests were performed. The test results are shown in Table 2.

TABLE 2

| | | | (a1) % by weight | (a2) % by weight | Solid phase polycondensation | | Unit | | Comparative Example 1 | | Comparative Example 2 | | Comparative Example 3 | | Comparative Example 4 | | Comparative Example 5 | |
|---|---|---|---|---|---|---|---|---|---|---|---|---|---|---|---|---|---|---|---|
| Composition | Thermoplastic polyester elastomer | A-3 | 78 | 22 | Not Performed | Percentage by weight based on composition | Percentage by weight based on total amount of A to C | 89.9 | 89.9 | 69.9 | 87.4 | — | — | — | — | — | — |
| | | A-4 | 78 | 22 | Performed | | | — | — | — | — | 89.9 | 89.9 | 69.9 | 87.4 | — | — |
| | | A-5 | 65 | 35 | Not Performed | | | — | — | — | — | — | — | — | — | 64.9 | 86.5 |
| | Glass fiber B | | | | | | | 10 | 10 | 10 | 12.5 | 10 | 10 | 10 | 12.5 | 10 | 13.3 |
| | Crystal nucleator C | | | | | | | 0.1 | 0.1 | 0.1 | 0.13 | 0.1 | 0.1 | 0.1 | 0.13 | 0.1 | 0.13 |
| | Polyester Resin D | | | | | Percentage by weight based on composition | | — | | 20 | | — | | 20 | | 25 | |
| Physical property | Melting point | | | | | °C. | | 220 | | 221 | | 220 | | 221 | | 221 | |
| | Crystallization temperature | | | | | °C. | | 197 | | 197 | | 197 | | 197 | | 193 | |
| | Melt flow rate (230° C.) | | | | | g/10 min | | 13 | | 12 | | 3 | | 2 | | 15 | |
| | Tensile breaking strength | | | | | MPa | | 43 | | 45 | | 43 | | 45 | | 45 | |
| | Tensile breaking elongation | | | | | % | | 18 | | 16 | | 18 | | 16 | | 20 | |
| | Flexural modulus (23° C.) | | | | | MPa | | 1,150 | | 1,190 | | 1,150 | | 1,200 | | 1,160 | |
| | Flexural modulus (−30° C.) | | | | | MPa | | 2,410 | | 2,400 | | 2,400 | | 2,450 | | 1,780 | |
| | Flex fatigue resistance [Number of breaking] (23° C.) | | | | | Times | | 150,000 | | 130,000 | | 300,000 | | 250,000 | | 120,000 | |

TABLE 2-continued

| (a1) % by weight | (a2) % by weight | Solid phase polycon- densation | Unit | Comparative Example 1 | Comparative Example 2 | Comparative Example 3 | Comparative Example 4 | Comparative Example 5 |
|---|---|---|---|---|---|---|---|---|
| Flex fatigue resistance [Number of breaking] (−30° C.) | | | Times | <1,000 | <1,000 | <1,000 | <1,000 | <1,000 |
| Izod impact strength (23° C.) | | | J/m | 16 | 16 | 18 | 16 | 14 |
| Izod impact strength (−30° C.) | | | J/m | 7 | 6 | 5 | 6 | 4 |
| Extrusion moldability | | | — | B | B | A | A | B |

As is clear from the results in Table 2, the molded resin belts obtained from the thermoplastic polyester elastomer resin compositions in Comparative Examples 1 to 5 that do not satisfy our conditions were inferior to the molded resin belt obtained from our thermoplastic polyester elastomer resin composition for resin belt materials in flexibility at −30° C. or flex fatigue resistance at 23° C. or −30° C. In Comparative Examples 1 and 2, the flexibility at −30° C. and the flex fatigue resistance at 23° C. and −30° C. were insufficient, and in Comparative Examples 3 and 4, although the flex fatigue resistance at 23° C. was good, the flexibility at −30° C. and the flex fatigue resistance at −30° C. were poor. In Comparative Example 5, although the flexibility at −30° C. was good, the flex fatigue resistance at 23° C. and −30° C. was poor.

The invention claimed is:

1. A thermoplastic polyester elastomer resin composition for resin belt materials, comprising:
    80 to 92.99% by weight of a thermoplastic polyester elastomer (A);
    7 to 19.99% by weight of a glass fiber (B);
    0.01 to 5.0% by weight of a crystal nucleator (C); and
    5 to 30% by weight of a polyester resin (D),
    wherein the thermoplastic polyester elastomer (A) is a polyester block copolymer including:
    40 to 70% by weight of a high melting point crystalline polymer segment (a1) including a crystalline aromatic polyester unit, and
    30 to 60% by weight of a low melting point polymer segment (a2) including an aliphatic polyether unit, and a melt flow rate measured in accordance with ASTM D1238 at 230° C. under a load of 2,160 g is 1.0 g/10 min or more and less than 10.0 g/10 min, and
    wherein the thermoplastic polyester elastomer resin composition does not comprise a plasticizer.

2. The thermoplastic polyester elastomer resin composition according to claim 1, wherein a flexural modulus measured in accordance with ASTM D790 at 23° C. is 900 MPa or more, and a flexural modulus measured in accordance with ASTM D790 at −30° C. is 2,000 MPa or less.

3. The thermoplastic polyester elastomer resin composition according to claim 1, wherein the crystal nucleator (C) is an inorganic substance.

4. A molded resin belt comprising the thermoplastic polyester elastomer resin composition according to claim 1, wherein the thermoplastic polyester elastomer resin composition is molded.

5. The thermoplastic polyester elastomer resin composition according to claim 2, further comprising 5 to 30% by weight of a polyester resin (D).

6. The thermoplastic polyester elastomer resin composition according to claim 2, wherein the crystal nucleator (C) is an inorganic substance.

7. A molded resin belt comprising the thermoplastic polyester elastomer resin composition according to claim 2, wherein the thermoplastic polyester elastomer resin composition is molded.

8. A molded resin belt comprising the thermoplastic polyester elastomer resin composition according to claim 3, wherein the thermoplastic polyester elastomer resin composition is molded.

9. The thermoplastic polyester elastomer resin composition according to claim 1, wherein the polyester resin (D) is prepared by polycondensation of at least one acid component selected from terephthalic acid, 2,6-naphthalenedicarboxylic acid, isophthalic acid and at least one diol component selected from ethylene glycol, propylene glycol, butylene glycol, and hexylene glycol.

10. The thermoplastic polyester elastomer resin composition according to claim 1, wherein the polyester resin (D) is selected from polybutylene terephthalate (PBT), polypropylene terephthalate (PPT), polyethylene terephthalate (PET), polyhexylene terephthalate (PHT), polyethylene naphthalate, polybutylene naphthalate (PBN), polycyclohexane-1,4-dimethylol terephthalate, polyethylene isophthalate/terephthalate (PET/I) and polybutylene (terephthalate/isophthalate) (PET/I).

11. The thermoplastic polyester elastomer resin composition according to claim 1, wherein the polyester resin (D) is selected from polyethylene terephthalate, polybutylene terephthalate, polybutylene naphthalate, and polybutylene (terephthalate/isophthalate).

12. The thermoplastic polyester elastomer resin composition according to claim 1, wherein the polyester resin (D) is polybutylene terephthalate.

* * * * *